Jan. 12, 1960     B. P. GASSNER     2,920,636
CONTROL VALVE

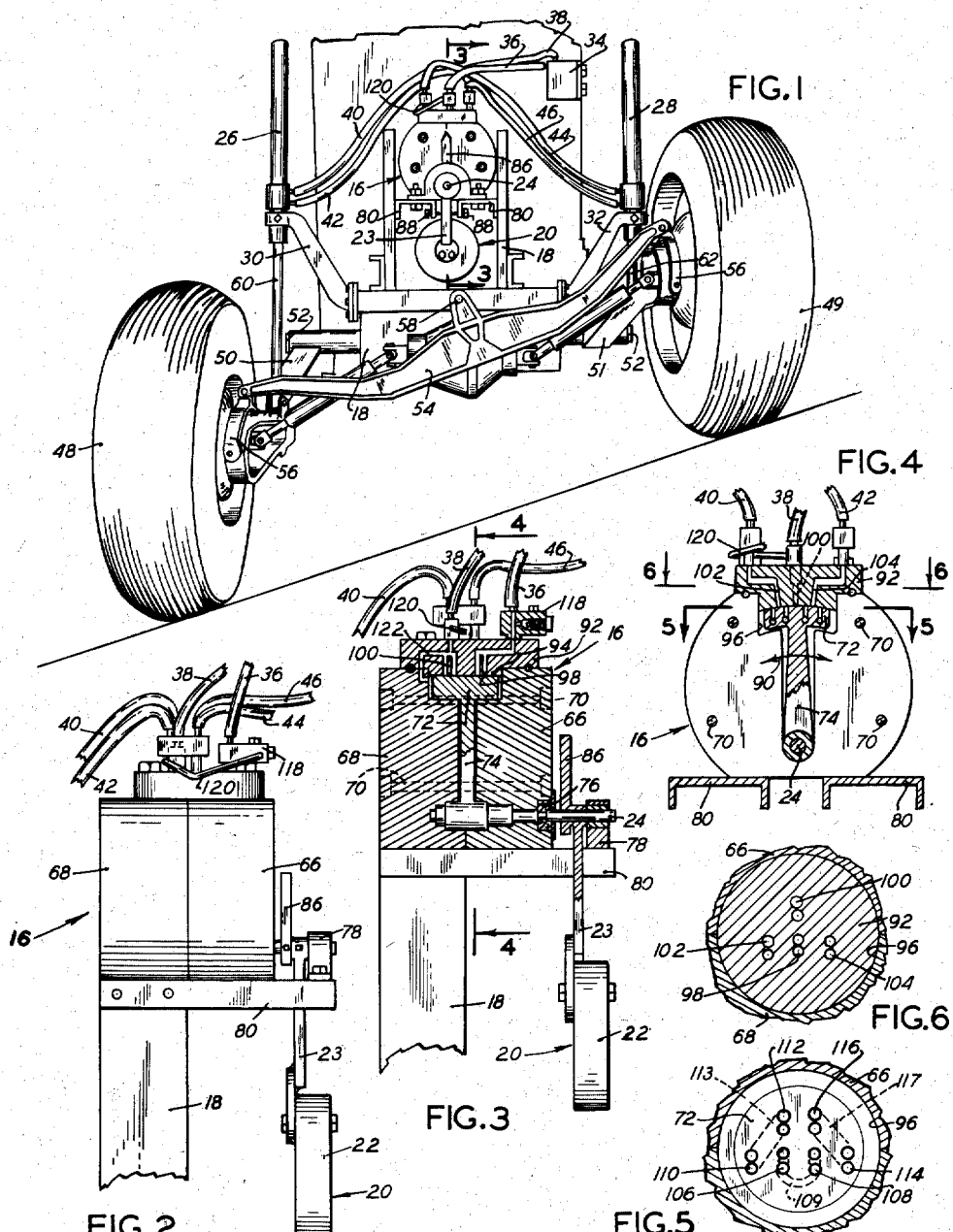

Filed June 20, 1955     3 Sheets-Sheet 2

INVENTOR.
BEAT P. GASSNER
BY
Buckhorn and Cheatham
ATTORNEYS

Jan. 12, 1960

B. P. GASSNER 2,920,636

CONTROL VALVE

Filed June 20, 1955

INVENTOR.
BEAT P. GASSNER
BY
Buckhorn and Cheatham
ATTORNEYS

United States Patent Office 2,920,636
Patented Jan. 12, 1960

2,920,636

CONTROL VALVE

Beat P. Gassner, Portland, Oreg.

Application June 20, 1955, Serial No. 516,542

4 Claims. (Cl. 137—45)

This invention relates to a control valve, and more particularly to a valve especially adapted to be actuated by a pendulum to control automatic leveling apparatus for vehicles such as harvesters or other agricultural machines, although the valve has general utility.

The valve of the present invention will control the operation of one or more hydraulic actuators, each having a cylinder and piston or plunger so as to supply hydraulic fluid to the cylinders and withdraw such fluid from said cylinders under control of very small control forces. The valve is of the rotary or pivoted type and requires a very small angular movement for actuation, for example, typical valves in accordance with the present invention may be actuated from a fully closed position to a fully open position by an angular movement of approximately three degrees. This is accomplished by positioning the movable valve member on a pivoted lever arm of substantial length, the movable valve member being on the end of the lever arm remote from the pivotal axis of the arm and having a valve surface concentric with the axis of the lever arm. Such valve surface has ports therein and engages a conforming concentric valve surface on a fixed valve member which also has valve ports therein. All of such ports extend substantially radially through the respective valve surfaces such that the resultant of the forces due to fluid pressure in the valve ports is substantially radial, i.e., through the pivotal axis of the lever arm. The fluid pressure therefore produces very little resistance to movement of the valve element about the axis of the lever arm.

As stated above, the valve of the present invention is particularly adaptable for actuation by a pendulum. Small travel of the valve element limits the travel of such pendulum to a very small angle, for example, six degrees total swing for the valve mentioned above. It is found that this limited movement of the pendulum effectively eliminates the hunting which frequently occurs with pendulum-actuated valves for leveling vehicles and, in any event, limits such hunting to movement through a very small angle which is negligible in the operation of agricultural machinery.

An object of the present invention is therefore to provide an improved control valve for hydraulic actuators.

Another object of the invention is to provide a hydraulic control valve of the pivoted or rotary type which requires a very small angular movement from fully closed to fully open position.

A further object of the invention is to provide a control valve for hydraulic actuators which is particularly adapted to be operated by a pendulum and which substantially eliminates the hunting normally occurring in pendulum-controlled automatic leveling devices for agricultural vehicles.

Other objects and advantages of the invention will appear in the following description thereof given in connection with the attached drawing of which:

Fig. 1 is a partial front elevation of an agricultural machine showing the control valve of the present invention mounted thereon;

Fig. 2 is a side elevation of the control valve structure with a part of the supporting structure therefor omitted;

Fig. 3 is a vertical section through the control valve taken on the line 3—3 of Fig. 1;

Fig. 4 is a partial vertical section through the control valve taken on the line 4—4 of Fig. 3;

Fig. 5 is a horizontal section, on an enlarged scale, taken on the line 5—5 of Fig. 4;

Fig. 6 is a horizontal section, on an enlarged scale, taken on the line 6—6 of Fig. 4;

Figure 7:
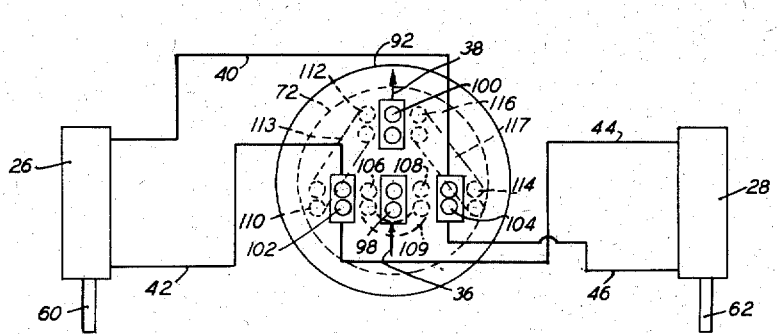
Fig. 7 is a diagrammatic view of the control valve ports showing the valve in neutral position.

Referring more particularly to the drawings, the control valve 16 of the present invention is shown as being mounted on the frame 18 of an agricultural machine, the valve being actuated by a pendulum 20 including a weight 22 and a pendulum rod 23 carrying the weight 22 and secured on a shaft 24 journaled in the casing of the control valve 16, the valve being mounted so that the shaft 24 extends longitudinally of the vehicle. As will be described in more detail below, the valve 16 under control of the pendulum 20 admits hydraulic fluid to and withdraws hydraulic fluid from a pair of hydraulic actuators 26 and 28 secured by a universal mounting at their lower ends to support arms 30 and 32, respectively, in turn secured to the frame 18 of the vehicle. Hydraulic fluid under pressure is delivered from a pump 34 through a conduit 36 to the valve 16 and returned to the pump 34 through a conduit 38, the pump being driven from any suitable source of power. The valve 16 is connected to the actuator 26 by means of conduits 40 and 42 and to the actuator 28 by means of conduits 44 and 46.

Drive wheels 48 and 49 for the vehicle are journaled on axles (not shown) secured to arms 50 and 51 pivotally mounted on a cross shaft 52 secured in the frame 18 so that the wheels 48 and 49 may move upwardly and downwardly with respect to each other and with respect to the frame. A laterally extending rocker arm 54 may be connected to the ends of the arms 50 and 51 through yokes 56, the rocker arm 54 having its mid portion pivotally connected to the frame 18 at 58. The hydraulic actuators 26 and 28 have downwardly extending piston rods 60 and 62 having their lower ends pivotally connected to the arms 50 and 51, respectively. It is apparent that downward movement of the piston rod 60 will lower the wheel 48 and raise the wheel 49. It is further apparent that the rocker arm 54 will cause upward movement of one of the piston rods 60 or 62 when the other of the piston rods is lowered, i.e., the wheels 48 and 49 are caused to move in opposite vertical directions by the rocker arm 54.

The body of the valve 16 is made up of two valve casing members 66 and 68 suitably secured together, for example, by bolts 70, and providing an internal space for receiving a movable valve member 72 which is mounted on the end of a lever arm 74 secured to the shaft 24. The shaft 24 is journaled in the casing members 66 and 68 and extends to the exterior of the front casing member 66, a suitable packing gland 76 being secured in the casing member 66 so as to surround the shaft 24. The shaft 24 is also journaled in a bearing member 78 secured to base members 80 which form a support for the casing members 66 and 68. The pendulum rod 23 is secured to the shaft 24 between the casing member 66 and the bearing member 78 and has an upwardly extending pointer member 86 which cooperates with an index mark on the casing 66 to indicate when the vehicle is level. The base members 80 may be of channel formation opening downwardly and may have adjustable stop screws 88 in their edge portions adjacent the pendulum rod 23 to limit oscillation of the pendulum. It will be apparent that oscillation of the pendulum will oscillate the movable valve member 72 and that motion of such valve member will be likewise limited by the stop screws 88. That is to say, the valve member 72 will be oscillated in Fig. 4 within the limits set by the stop screws in the direction of the arrow 90 shown thereon. A fixed valve member 92 is secured to the upper surfaces of the valve casing members 66 and 68 and has a downwardly extending boss 94 of cylindrical cross section snugly fitting in a cylindrical bore 96 in the casing members 66 and 68, the lower surface of the boss 94 of the fixed valve member having a cylindrical valve surface closely fitting an upper cylindrical valve surface on the movable valve member 72.

The fixed valve member 92 has an inlet port 98 (Figs. 3 and 6) in its lower surface connected to the inlet conduit 36 from the pump 34 and an outlet port 100 connected to the outlet conduit 38 leading back to the pump 34. The inlet port 98 and outlet port 100 are positioned substantially in the center line of the fixed valve member 92 and are spaced from each other in a direction parallel to the shaft 24. The fixed valve member 92 is also provided with a pair of actuator ports 102 and 104, the port 102 being connected to the lower portion of the actuator 26 through the conduit 42 and to the upper portion of the actuator 28 through the conduit 44. Similarly, the port 104 is connected to the upper portion of the actuator 26 of the conduit 40 and to the lower portion of the actuator 28 through the conduit 46.

The movable valve member 72 has a plurality of ports therein, some of which are interconnected. Thus, the valve member has ports 106 and 108 interconnected by a passage 109 so as to be adapted to connect the inlet port 98 of the fixed valve member 92 with either the actuator port 102 or the actuator port 104. The movable valve member 72 also has ports 110 and 112 interconnected by a passage 113 so as to be adapted to connect the actuator port 102 of the fixed valve member 92 to the outlet port 100 thereof, and also ports 114 and 116 interconnected by a passage 117 so as to be adapted to connect the actuator port 104 of the fixed valve member 92 with the outlet port 100 thereof. It is apparent from Figs. 5 and 6 that the ports 98, 102 and 104 in the fixed valve member 92 are in alignment in the direction of movement of the movable valve member 72 about the shaft 24 and also that they are in alignment in the direction of such movement with the ports 106, 108, 110 and 114 in the movable valve member 72. The outlet port 100 in the fixed valve member 92 is displaced from the ports just mentioned axially of the shaft 24 and is in alignment with the ports 112 and 116 in the movable valve member 72 in a direction of movement of such valve member.

Figure 8:
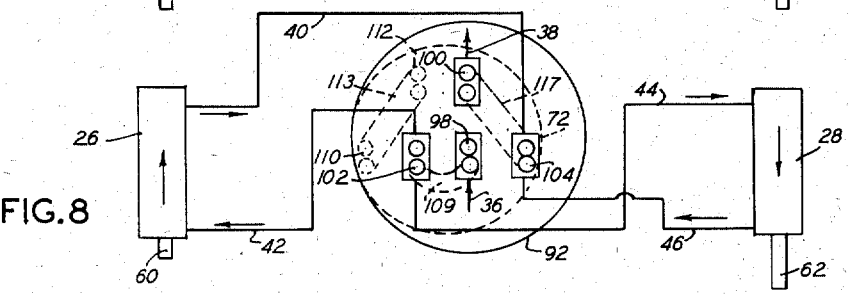
Fig. 8 is a view similar to Fig. 7 showing the movable member of the control valve fully actuated to the left.
Figure 9:
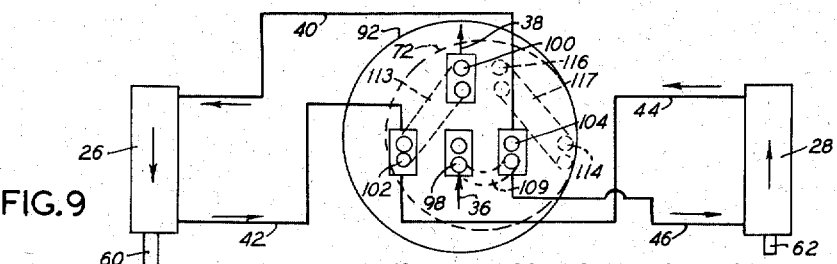
Fig. 9 is a view similar to Fig. 7 showing the movable member of the control valve fully actuated to the right.

Three different positions of the movable valve member 72 with respect to the fixed valve member 92 are diagrammatically illustrated in Figs. 7, 8 and 9. In these figures the movable valve member 72 is indicated by a dotted circle and the ports therein are also shown dotted, and the stationary valve member 92 is indicated by a circle in solid line, the ports therein also being shown in solid line. In Fig. 7 the valve member 72 is centrally positioned with respect to the fixed valve member 92. This is the condition when the vehicle is in level position and it will be noted that all of the ports in the movable valve member 72 are out of alignment with the ports in the fixed valve member 92. Hydraulic fluid is trapped in the actuators 26 and 28, and both the inlet conduit 36 and the outlet conduit 38 are closed at the valve. Under these conditions provision is made for by-passing hydraulic fluid from the inlet conduit 36 to the outlet conduit 38. Thus, a pressure relief valve 118, shown diagrammatically in Fig. 3, is connected by a conduit 120 (Fig. 2) to the connecting element for the outlet conduit 38. When the inlet port 98 in the fixed valve member 92 does not register with any ports in the valve member 72, the pump pressure builds up sufficiently to actuate the pressure relief valve 118 and by-pass hydraulic fluid to the outlet conduit 38 which returns such fluid to the pump 34. Any hydraulic fluid leaking past the mating surfaces of the fixed valve member 92 and the movable valve member 72 is returned to the outlet conduit 38. For this purpose a duct or passage 122 (Fig. 3) is provided in the fixed valve member 92 and the casing member 68 so as to connect the interior of the casing members 66 and 68 with the outlet conduit 38. The interior of the valve casing in which the movable valve member 72 and shaft 24 are positioned is thus maintained under low hydraulic pressure so as to prevent leakage through the packing gland 76.

If the vehicle shown in Fig. 1 tilts to the right in such figure, the pendulum will swing to the right to move the valve member 72 to the left. This is the condition shown in Fig. 8. In this figure the valve ports 98 and 102 in the fixed valve member 92 are connected together by the passage 109 in the movable valve member 72, and the ports 100 and 104 in the stationary valve member 72 are connected together by the passage 117 in the movable valve member 72. Under these conditions, hydraulic fluid flows from the inlet conduit 36 through the passage 109 and conduit 44 to the upper portion of the actuator 28 so as to lower the piston rod 62 and raise the right side of the vehicle. The fluid discharged from the lower end of the actuator 28 flows through the conduit 46 and the passage 117 in the movable valve member 72 so as to be exhausted through the outlet conduit 38 to the pump. At the same time, fluid flows from the inlet conduit 36 through the passage 109 and the conduit 42 to the lower portion of the actuator 26, thus retracting piston rod 60, and fluid exhausted from the upper portion of the actuator 26 is conducted through the conduit 40 and passage 117 to the outlet conduit 38. As soon as the vehicle returns to level condition, the pendulum returns to its central position to again bring the valves to the position shown in Fig. 7. If the left side of the vehicle becomes low, the position of the movable valve member 72 with respect to the fixed valve member 92 is shown in Fig. 9. Under the conditions shown in such figure, the piston rod 60 of the actuator 26 is lowered to raise the left side of the vehicle while at the same time the piston rod 62 of the actuator 28 is retracted. The vehicle is returned to level position and the movable valve member 72 then returns to its central position.

It is apparent that a very short movement of the valve member 72 relative to the fixed valve member 92 is required to complete the connections between the inlet and outlet conduits and the actuators just described. It is also apparent that complete opening or closing of the valve, i.e., complete movement of the valve member 72, is not required for actuation of the hydraulic actuators. That is to say, even a partial or slight registration of the valve ports in the movable valve member 72 with the valve ports in the fixed valve member 92 is sufficient to cause operation of the actuators 26 and 28 to maintain the vehicle level. As stated above, the travel of the valve member, i.e., the travel of the pendulum, can be made very small for even complete registration of the ports in the valve member and the valve port member. With the valves shown, hunting of the system about the level position is substantially eliminated or, in any event, is confined to a very small angular displacement of the vehicle from the level position.

Figure 10:
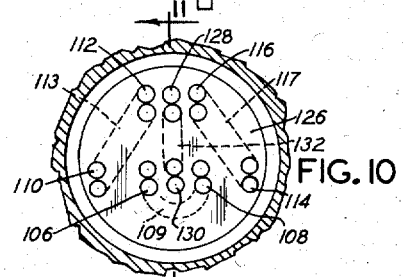
Fig. 10 is a view similar to Fig. 5, on a still larger scale, showing the port arrangement of a modification of the movable member of the control valve.
Figure 11:
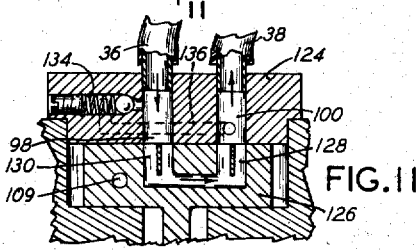
Fig. 11 is a vertical section of the control valve of Fig. 10 taken on the line 11—11 of Fig. 10.

The valve thus far described may be called a "closed neutral" type of valve in that the inlet conduit is closed by the valve when the valve is in the neutral or central position. A modification of the valve is indicated in Figs. 10 and 11 which is of the "open neutral" type. In the valve structure of Figs. 10 and 11, the fixed valve member 124 has the same ports in its face as the fixed valve member 92 of Figs. 1 to 9. Thus, as indicated in Fig. 11, it has an inlet port 98 and an outlet port 100. Also, the movable valve member 126 has the same ports as the valve member 72 of Figs. 1 to 9. Thus, the movable valve member 126 has ports 106 and 108 connected by the passage 109 and also has ports 110 and 112 connected by the passage 113 as well as ports 114 and 116 connected by the passage 17. In addition, the movable valve member 26 of Fig. 9 has ports 128 and 130 connected by the passage 132. The port 128 is positioned between the ports 112 and 116 so as to register with the outlet port 100 in the fixed valve member 124 when the movable valve member 126 is in its central or neutral position, and the port 130 is positioned between the ports 106 and 108 so that it registers with the inlet port 98 of the fixed valve member 124 when the movable valve member 126 is in its central or neutral position. Thus, when the movable valve member 126 is in its central or neutral position, hydraulic fluid is by-passed directly from the inlet conduit 36 to the outlet conduit 38.

During movement of the movable valve member 126 from its central position, the inlet port 98 is momentarily closed and a pressure relief valve is provided to by-pass fluid from the inlet conduit 36 to the outlet conduit 38 during closure of such inlet conduit. Thus, a pressure relief valve 134 is shown as being positioned directly in the fixed valve member 124 in Fig. 11 and is connected by means of the passage 136 in the valve port member to the outlet port 100. The structure in Figs. 10 and 11 unloads the pump 34 when the control valve is in the neutral position and also enables a plurality of control valves, which may operate at different times, for example, valves controlling a leveling mechanism as well as other hydraulically actuated mechanisms of an agricultural machine, to be operated in series if desired, the outlet conduit of each of the valves being connected to the inlet conduit of the next succeeding valve.

Figures 12, 13:
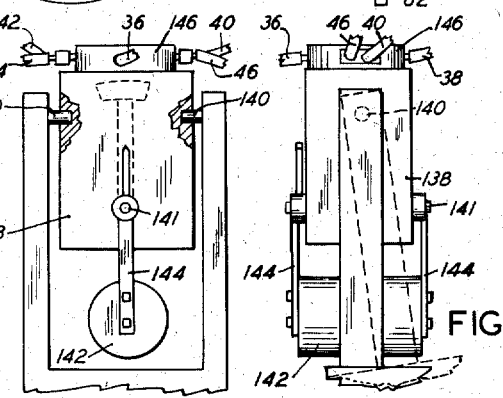
Fig. 12 is a front elevation of a further modified control valve.
Fig. 13 is a side elevation of the control valve of Fig. 12.
Figure 14:
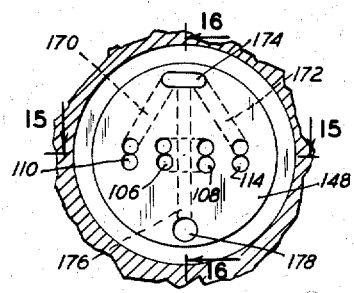
Fig. 14 is a horizontal section similar to Fig. 5 showing the port arrangement of a further modification of the movable valve member.

Since the agricultural machine or other vehicle may tilt about both horizontal axes thereof, the control valve of the present invention may be mounted so that the pendulum can assume a vertical position even though the vehicle is tipped about the horizontal axis extending laterally of the vehicle. Thus, the valve body 138 of a modified type valve shown in Figs. 12 and 13 may be mounted on pivots 140 in alignment with each other and extending laterally of the vehicle. As shown in Fig. 13, the shaft 141 for the pendulum weight 142 can extend all the way through the valve body 138 and the pendulum weight 142 can be positioned between pendulum rods 144 on both sides of the valve body 138 so as to be positioned directly below the valve body. Thus the pendulum can remain in a vertical position so far as inclination about an axis extending laterally of the vehicle is concerned, it being apparent that the center of gravity of the valve and pendulum will remain directly below the pivots 140 when the vehicle tilts about such axis extending laterally of the vehicle. It is noted that the various connections to the conduits for hydraulic fluid extend horizontally from the fixed valve member 146. Thus the inlet and outlet conduits 36 and 38, as well as the conduits 40 and 42 for the actuator 26 and the conduits 44 and 46 for the actuator 28, may be connected to suitable fittings extending horizontally from the fixed valve member 146.

A modified arrangement of valve ports in the fixed valve member 146 and a movable valve member 148 is shown in Figs. 14 to 17, inclusive, and such arrangement of valve ports has the advantage that the pump is unloaded when it is not actually being employed to supply fluid to the actuators. The valve of these figures is of the "open neutral" type and, in contrast to the valve of Figs. 10 and 11, the neutral remains open until the valve moves far enough to supply fluid to an actuator. That is to say, in the arrangement of ports shown in Figs. 10 and 11, the by-pass 132 between the inlet conduit and the outlet conduit is closed before connection is made between the inlet and outlet ports and an actuator port. This means that the pump is loaded as soon as the ports to the by-pass are closed or partially closed and that the pressure relief valve begins operating, thus causing heating of the hydraulic fluid. On the contrary, in the valve port arrangement of Figs. 14 to 17, it is the closing of the by-pass between the inlet conduit and the outlet ports as the movable valve member moves from its neutral position, which causes fluid to be delivered to an actuator since the valve effects connection between the inlet port and an actuator port as well as between the outlet port and the other actuator port at the same time it begins to constrict the by-pass connection between the inlet port and outlet port. It is still advisable to employ a pressure relief valve such as indicated in Fig. 3, but such valve will only operate if the piston of an actuator reaches the end of its travel while the control valve is still supplying hydraulic fluid to the actuator.

Figure 15:
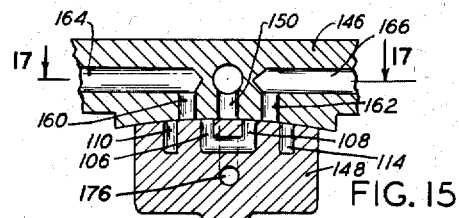
Fig. 15 is a vertical section taken on the line 15—15 of Fig. 14 also showing a portion of the fixed valve member in vertical section.
Figure 16:
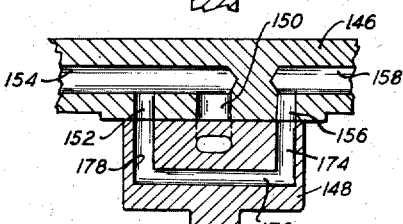
Fig. 16 is a vertical section taken on the line 16—16 of Fig. 14 also showing a portion of the fixed valve member in vertical section.
Figure 17:
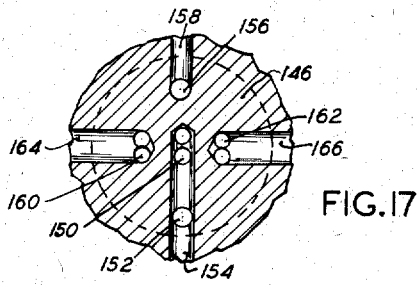
Fig. 17 is a horizontal section through the fixed valve member taken on the line 17—17 of Fig. 15.

The fixed valve member 146 of Figs. 15 to 17 has an inlet port 150 and a by-pass port 152 both connected to an inlet passage 154 and also has an outlet port 156 connected to an outlet passage 158. The fixed valve member 146 also has actuator ports 160 and 162 connected to horizontally extending passages 164 and 166, respectively, the actuator ports 160 and 162 being in alignment with the inlet port 150 in the direction of movement of the movable valve member 148. The inlet port 150, by-pass port 152 and outlet port 156 are also preferably in alignment along a line at right angles to a line joining the inlet port 150 and the actuator ports 160 and 162.

The movable valve member 148 has a plurality of ports therein, certain of said ports being interconnected. The movable valve member 148 thus has a pair of ports 106 and 108 which may be the same as the ports 106 and 108 in the movable valve member of the modifications previously described, these ports being interconnected and serving to connect the inlet ports 150 in the fixed valve member with either of the actuator ports 160 or 162 of the fixed valve member when the movable valve member 148 is moved to the left and right, respectively, in Fig. 15. The movable valve member also has a pair of ports 110 and 114 in alignment with the ports 106 and 108 in the direction of movement of the movable valve member, the ports 110 and 114 being of the same type and serving the same purpose as the ports 110 and 114 of the modifications previously described. These ports 110 and 114 are connected by means of passages 170 and 172, respectively, to a port 174 which is elongated in the direction of movement of the movable valve member and which is also connected by a passage 176 with a port 178.

Figure 18:
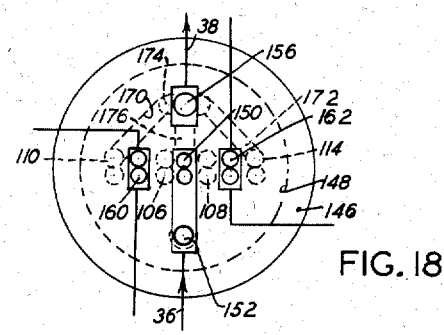
Fig. 18 is a diagrammatic view showing the control valve ports of the valve of Figs. 14 to 17 with the movable valve member in neutral position.
Figure 19:
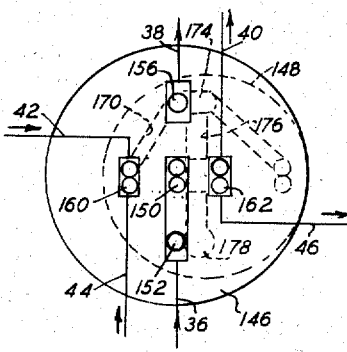
Fig. 19 is a view similar to Fig. 18 showing the movable valve member moved to the right.

The port 174 remains in register with the outlet port 156 in the fixed valve member 146 at all times and the port 178 in the movable valve member 148 registers with the by-pass port 152 in the fixed valve member when the movable valve member 148 is in neutral position. The port 178, passage 176 and port 174 thus connect the inlet passage 154 with the outlet passage 158 when the movable valve member 148 is in neutral position, which position is shown diagrammatically in Fig. 18. In this position the actuator ports 160 and 162 are closed and hydraulic fluid flows from the inlet conduit 36 through the by-pass port 152 in the fixed valve member and the port 178, passage 176 and port 174 in the movable valve member and through the outlet port 156 so as to be discharged through the outlet conduit 38. When the movable member 148 is moved to the right with respect to the stationary valve member 146, as indicated in Fig. 19, the inlet port 150 is connected to the actuator port 162 by interconnected ports 106 and 108 in the movable member 148 and at the same time the actuator port 160 is connected to the outlet port 156 through the port 110, passage 170 and port 174 so that hydraulic fluid is delivered to the actuators through the conduits 40 and 46 and returned through the conduits 42 and 44. It is to be noted that it is the moving of port 178 in the movable valve member 148 out of register with the by-pass port 152 in the fixed valve member 156 which, by disconnecting the inlet passage 154 from the outlet passage 158 causes hydraulic fluid to be delivered to an actuator. The pump is, therefore, unloaded except when actually delivering fluid to an actuator and there is no position of the movable valve member between the neutral position and an actuated position thereof which blocks flow of hydraulic fluid through the valve as is the case in the valve port arrangement of Figs. 10 and 11.

Figure 20:
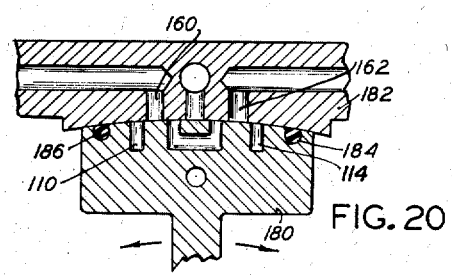
Fig. 20 is a fragmentary vertical section showing a further modification of the valve.
Figure 21:
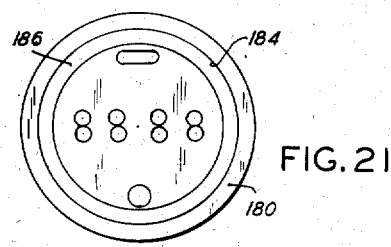
Fig. 21 is a plan view of the movable valve member of Fig. 20.

A further modification of the control valve is shown in Figs. 20 and 21. The movable and stationary valve members 180 and 182 may have any of the previously discussed port arrangements but for purposes of illustrations are shown as having the port arrangement of Fig. 15. As shown in Figs. 20 and 21, one of the valve members, for example, the movable valve member 180 may have a gasket groove 184 in its valve surface which is in contact with the valve surface of the other valve member, the valve groove 184 extending around the periphery of the valve member and enclosing the area containing the ports therein. A gasket ring 186 is positioned in the gasket groove 184 so as to contact the valve surface of the other valve member. It will be apparent that the gasket 186 should be so positioned that movement of the movable valve member 180 does not move the gasket over any of the ports in the other valve member. The gasket can be of any suitable material and is preferably a resilient material resistant to the hydraulic fluid employed and capable of being lubricated by the hydraulic fluid. The gasket effectively prevents leakage of hydraulic fluid from the valve, particularly in valve port arrangements having a plurality of ports connected at all times to the outlet or suction conduit. Any leakage from the ports transmitting fluid under pressure finds its way into the outlet passage 158 in the stationary valve member and is thus withdrawn from between the valve surfaces.

It is apparent that in all of the modifications of the control valve, the external connections to the inlet and outlet ports can be interchanged so that the inlet port becomes the outlet port and vice versa, if the external connections to the actuator ports are likewise properly interchanged or if, for some reason, it is desired to reverse the operation of the actuators.

While the valve of the present invention has been shown in association with an agricultural vehicle, it is also apparent that the valve has general utility wherever automatic leveling of a device is desired and also that the valve can be actuated by mechanism other than a pendulum in any environment where it is desired to accurately control hydraulic actuators.

I claim:

1. A pendulum actuated valve assembly for controlling a hydraulic actuator which assembly comprises a valve casing structure, a valve structure journaled in said casing structure for pivotal movement relative to said casing structure about a horizontally extending pivotal axis, said valve structure including a lever arm extending in a radial direction from said pivotal axis and a valve member at the end of said arm remote from said axis, said valve member having a valve surface concentric with said axis, said casing structure including a valve member having a valve surface also concentric with said axis and adjacent the first mentioned valve surface, said structures each being rigid structures providing radii of unvarying length between said surfaces and said axis to thereby provide a fixed clearance between said surfaces, a pendulum structure journalled in said casing for pivotal movement about said axis for causing said pivotal movement of said valve structure relative to said casing structure when said casing structure is tilted about said axis, and means providing end limits for said pivotal movement, said pendulum structure and said valve structure having free swinging movement between said limits at all times and said surfaces having cooperating valve ports therein for controlling the flow of hydraulic fluid through said valve, said casing having pivot means for pivotally supporting said casing for free pivotal movement about a horizontally extending axis at right angles to the first mentioned axis and positioned above the center of gravity of said assembly.

2. A pendulum actuated valve assembly for controlling a hydraulic actuator which assembly comprises a valve casing structure, a valve structure including a horizontally extending shaft journaled in said casing structure for pivotal movement relative to said casing structure about the axis of said shaft, said valve structure including a lever arm extending in a radial direction from said shaft and valve member at the end of said arm remote from said shaft, said valve member having a valve surface concentric with said axis, said casing structure including a valve member having a valve surface also concentric with said axis and adjacent the first mentioned valve surface, said structures each being rigid structures providing radii of unvarying length between said surfaces and said axis to thereby provide a fixed clearance between said surfaces, a pendulum structure connected to said shaft for causing said pivotal movement of said valve structure relative to said casing structure when said casing structure is tilted about said axis, and means providing end limits for said pivotal movement, said pendulum structure having free swinging movement between said limits at all times and said surfaces having cooperating valve ports therein for controlling the flow of hydraulic fluid through said valve, said casing having pivot means for pivotally supporting said casing for free pivotal movement about a horizontally extending axis at right angles to the axis of said shaft and positioned above the center of gravity of said assembly.

3. A pendulum actuated valve assembly for controlling a hydraulic actuator which assembly comprises a valve casing structure, a valve structure including a horizontally extending shaft journaled in said casing structure for pivotal movement relative to said casing structure about the axis of said shaft, said valve structure including a lever arm extending in a radial direction from said shaft and a valve member at the end of said arm remote from said shaft, said valve member having a valve surface concentric with said axis, said casing structure including a valve member having a valve surface also concentric with said axis and adjacent the first mentioned valve surface, said structure each being rigid structures providing radii of unvarying length between said valve surfaces and said axis to thereby provide a fixed clearance between said surfaces, said casing enclosing said valve structure so as to contain hydraulic fluid surrounding said arm, said shaft extending to the exterior of said casing, a pendulum structure connected to said shaft exteriorly of said casing for causing said pivotal movement of said valve structure relative to said casing structure when said casing structure is tilted about said axis, and means providing end limits for said pivotal movement, said pendulum structure having free swinging movement between said limits at all times and said surfaces having cooperating valve parts therein for controlling the flow of hydraulic fluid through said valve, said casing having pivot means for pivotally supporting said casing for free pivotal movement about a horizontally extending axis at right angles to the axis of said shaft and positioned above the center of gravity of said assembly.

4. A pendulum actuated valve assembly for controlling a hydraulic actuator which assembly comprises a valve casing structure, a valve structure journaled in said casing structure for pivotal movement relative to said casing structure about a horizontally extending pivotal axis, said valve structure including a lever arm extending in a radial direction from said axis and a valve member at the end of said arm remote from said axis, said valve member having a valve surface concentric with said axis, said casing structure including a valve member having a valve surface also concentric with said axis and adjacent the first mentioned valve surface, said structures each being rigid structures providing radii of unvarying length between said surfaces and said axis to thereby provide a fixed clearance between said surfaces, a pendulum structure for causing said pivotal moving of said valve structure relative to said casing structure when said casing structure is tilted about said axis, and means providing end limits for said pivotal movement, said pendulum structure having free swinging movement between said limits at all times and said casing structure having a fluid supply conduit and a fluid exhaust conduit connected thereto and having a pair of actuator conduits also connected thereto, said surfaces having cooperating parts connecting said supply conduit to said exhaust conduit when said valve structure is in a central position relative to said casing structure and connecting each of said actuator conduits to one of said supply and exhaust conduits when said valve structure is pivoted from said central position relative to said casing, said casing having pivot means for pivotally supporting said casing for free pivotal movement about a horizontally extending axis at right angles to the first mentioned axis and positioned above the center of gravity of said said assembly.

References Cited in the file of this patent

UNITED STATES PATENTS

| | | |
|---|---|---|
| 2,088,528 | McCune | July 27, 1937 |
| 2,226,193 | Barrett | Dec. 24, 1940 |
| 2,353,503 | Rost | July 11, 1944 |
| 2,474,471 | Dolan | June 28, 1949 |
| 2,634,679 | Kern | Apr. 14, 1953 |
| 2,655,167 | Dunkelow | Oct. 13, 1953 |
| 2,671,433 | Meddock | Mar. 9, 1954 |
| 2,684,254 | Goss | July 20, 1954 |
| 2,796,717 | Orelind et al. | June 25, 1957 |

UNITED STATES PATENT OFFICE

CERTIFICATE OF CORRECTION

Patent No. 2,920,636            January 12, 1960

Beat P. Gassner

It is hereby certified that error appears in the printed specification of the above numbered patent requiring correction and that the said Letters Patent should read as corrected below.

Column 4, line 72, for "pendllum" read -- pendulum --; column 5, line 41, for "passage 17" read -- passage 117 --; line 42, for "member 26" read -- member 126 --; same line, for "Fig. 9" read -- Fig. 10 --; column 6, line 65 after "member 148" insert -- also --; column 9, line 8, for "structure" read -- structures --; column 10, line 24, before "assembly" strike out "said".

Signed and sealed this 5th day of July 1960.

(SEAL)
Attest:

KARL H. AXLINE
Attesting Officer

ROBERT C. WATSON
Commissioner of Patents